Oct. 22, 1940.　　　K. W. KUBAN　　　2,218,757
AUTOMATIC CUTOUT AND BRAKE FOR BREAD SLICING MACHINES
Filed Sept. 11, 1939
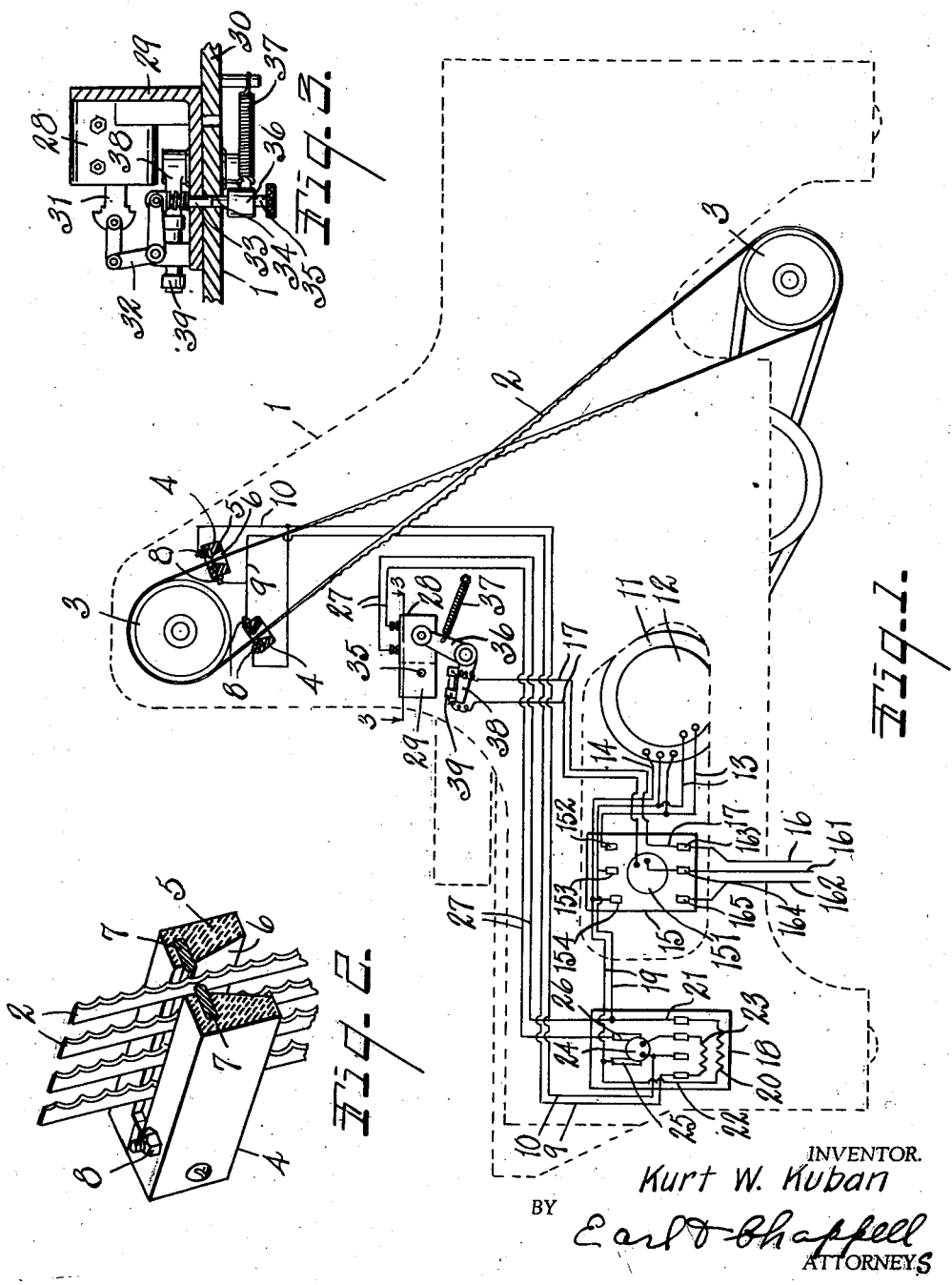
INVENTOR.
Kurt W. Kuban
BY
Earl D. Chappell
ATTORNEYS Patented Oct. 22, 1940

2,218,757

UNITED STATES PATENT OFFICE 2,218,757

AUTOMATIC CUTOUT AND BRAKE FOR BREAD SLICING MACHINES

Kurt W. Kuban, Battle Creek, Mich., assignor to Battle Creek Bread Wrapping Machine Company, Battle Creek, Mich., a corporation of Michigan Application September 11, 1939, Serial No. 294,286

20 Claims. (Cl. 192—129)

This invention relates to improvements in automatic cutout and brake for bread slicing machine.

The main objects of this invention are:

First, to provide a novel and highly effective automatic cutout and brake for a bread slicing machine particularly of the type having a plurality of band saw cutters whereby to quickly terminate the motion of the cutters in the event of breakage of one or more thereof.

Second, to provide a machine of the type described wherein the stopping of the machine, including the saws and the actuating means therefor, is initiated through the agency of a broken band saw blade itself, the action of stopping the machine being practically instantaneous following the breaking of the sawing element.

Third, to provide a device of the type described including contact means controlled by the flexible band saw and automatic switching provisions controlling further braking mechanisms and the motor for the machine, which last named means are standardized in nature and may be readily assembled on existing machines with a minimum of difficulty.

Further objects relating to details and economies of the invention will definitely appear from the description to follow. The invention is defined in the claims.

A structure embodying the features of the invention is illustrated in the accompanying drawing, wherein:

Fig. 1 is a diagrammatic view illustrating in dotted lines a bread slicing machine of the band saw type, the electrical connections and wiring diagram for automatically effecting the stopping of the band saw in the event of breakage thereof being illustrated in solid lines.

Fig. 2 is a perspective view illustrating the novel saw-controlled break detecting device embodied in this invention in operative relation to the saws of the machine, the said device being in transverse section to illustrate details of construction thereof.

Fig. 3 is a fragmentary view in section on a line corresponding to line 3—3 of Fig. 1, illustrating details of one of the circuit making instrumentalities of this invention.

An extremely serious objection to bread slicers of the band saw type has been the difficulty experienced in stopping the machine when a band saw breaks as it inevitably does some time or another. In the event of such breakage and particularly when there are a number of the saws assembled as in the usual practice in bread slicing machines, the broken saw tangles with the other saws, frequently spoiling the edges of other saws and sometimes causing breakage thereof and in general inflicting substantial damage to the machine until an operator can cut the machine off.

The present invention relates to a safety cutout assembly for automatically and practically instantaneously terminating the operation of the machine in the event of a band saw breakage so that the stated difficulties are eliminated.

Referring to the drawing, the reference numeral 1 in general indicates a bread slicing machine of the band saw type having a plurality of continuous saw elements 2 trained around pulleys or drums 3 and disposed in such manner to subdivide a loaf of bread as the latter travels through the machine in a well-known manner. The saws are preferably disposed in crossing or figure eight relation as illustrated in Fig. 1. Adjacent the uppermost pulley 3 I provide a pair of contact assemblies 4, there being preferably one of these assemblies on either side of the drum or pulley, as illustrated in Fig. 1.

The general construction of these assemblies is illustrated in Fig. 2, consisting of an insulating body 5 having a central elongated slot-like opening or recess 6 through which the blades 2 pass in their travel to and from the adjacent pulley. Adjacent each side of the recess the body 5 has set therein the elongated or rod contacts or bus elements or bars 7, these contacts being electrically insulated from one another and each being provided with a binding post 8 to which the respective leads 9, 10 are attached when the system is operatively assembled on the slicing machine.

The foregoing describes the general theoretical construction of the contact block assembly 4, although it will be apparent that various modifications therein are necessary in practice. In the actual commercial adaptation the individual contact bars 7 of each pair are mounted for separating movement so as to permit the insertion of the continuous saw blades 2 in the slot 6 of the assembly. However, I have not illustrated such an embodiment, inasmuch as the present invention is not concerned with particular details of any of the various instrumentalities making up the control device.

From the foregoing it will be apparent that should one of the saw blades 2 break, it will by reason of the fact of the twisting of the blade in figure-8 conformation tend to straighten out and complete a circuit across the contacts 7 whereby an electrical current is caused to flow in leads 9, 10 which is operative to energize various parts of the control system to be hereinafter described, with the result that the motor for driving the machine is brought to rest by the termination of the motor energizing circuit and the energization of a suitable brake attached to the motor.

In Fig. 1, the motor for actuating the machine is indicated by the reference numeral 11 while a suitable conventional electric brake 12 is connected thereto in a well known manner, being attached to the motor shaft to quickly slow down and stop the motor when the brake is actuated. This brake is of the type wherein the braking surfaces are maintained separated by an electromagnet energized through leads 13, being spring urged into engagement upon cessation of the current flow in these leads. It has not been felt necessary to illustrate the details of construction of the brake since it is conventional in all respects and applied to the motor in a conventional manner. As illustrated, the motor and brake are in parallel circuit relation, the leads for the motor being indicated by the reference numeral 14, and the flow of current in these leads 13, 14 is controlled by an electromagnetic switch 15 of conventional type. The reference numerals 16, 161, 162 indicate the input leads for the switch, which are parts of a three-wire system for supplying a suitable original voltage. These input leads are fastened respectively to switch contacts 163, 164, 165. The coil 151 of the electromagnet of the switch 15 has one of its terminals connected to the center contact 164 on the switch to enable the coil to be energized in a manner to be hereinafter described under the control of an electrically actuable switch to be described.

It will be understood from the wiring diagram of Fig. 1 that when coil 151 is de-energized the switch contacts 152, 153, 154 will be electrically disconnected from power contacts 163, 164, 165 to de-energize the motor and brake circuits and terminate the operation of motor 11 and cause brake 12 to be automatically spring actuated in the manner described.

In parallel with the motor and brake circuits is a further circuit for a remote control 18 the leads 19 of which circuit are connected to contacts 153, 154 on the magnetic switch, as are the motor and brake circuit leads, so that the remote control is continuously energized through magnetic switch 15 when the latter is operative, i. e., when coil 151 is energized. These last named leads 19 are connected to the primary 20 of a transformer on the remote control through wires 21, 22. The secondary 23 of the transformer is connected to a relay coil 24 on the remote control adapted when energized to actuate the armature of the relay to complete a circuit through contacts 25, 26.

The transformer steps the current down from the primary voltage to a relatively low secondary value. It will be noted that secondary 23 is in series with the contact assemblies 4 so that an energizing circuit is completed through the coil 24 when the saw blade 2 breaks to actuate the relay as described above and complete a high voltage circuit through contacts 25, 26 as mentioned above. This last named high voltage circuit includes the leads 27 attached to contacts 25, 26 and to the coil of a solenoid 28 mounted on a bracket 29 secured to the machine frame 30 (see Fig. 3). Energization of this last named solenoid coil attracts the armature 31 of the solenoid and actuates a pivoted bell crank lever 32 to which the armature is articulated, with the result that a pin 33 pivotally connected to one arm of the solenoid controlled bell crank is projected through an aperture 34 in the bracket 29 and machine wall, with the further resultant expulsion of a switch knock-out pin 35 slidably carried in the end of one arm of a switch bell crank lever 36 pivoted to the machine frame. Pins 33, 35 are in end engagement in aperture 34 when the lever 36 is in "on" position, or to the left in Fig. 3. Bell crank lever 36 is resiliently urged in clockwise direction as viewed in Fig. 1 by means of a coil spring 37. The other arm 38 of the lever 36 carries a mercury or other suitable limit switch 39 to the opposite terminals of which the leads 17 are connected. These leads are also connected respectively to a terminal of the magnetic switch coil 151 and to the input wire 16 at contact 163. Thus, when in the "on" position of Fig. 3, the leads 17 are electrically connected through the mercury switch and an energizing circuit is completed through coil 151, but when arm 38 is tilted upwardly to its "off" position in Fig. 1 (following energization of solenoid 28 as described above) the magnetic switch circuit is de-energized, breaking the energizing circuits for the motor and brake withholding device, as described above, with the result that the machine is quickly and effectively stopped. Of course, in "on" position of switch arm 38, the magnetic switch 15 is energized and maintains the motor and brake circuits.

In operation, assuming the parts to be in the "off" position illustrated in Fig. 1, so that the energizing circuit for magnetic switch 15 is interrupted, the bell crank lever 36 and the mercury switch carried thereby are manually actuated to the "on" position illustrated in Fig. 3, with the knock-out pin 35 in aperture 34 to hold the lever in this position. This completes the circuit through the mercury switch 39 and magnetic switch coil as follows: Series connected leads 16, 17, mercury switch 39, lead 17, the coil 151, contact 164 and lead 161. Energization of the electromagnet electrically connects contacts 152, 153, 154 with supply leads 16, 161, 162, respectively to complete an input voltage supply for remote control 18 and for motor 11 and brake 12, whereby the machine is put in operation. Assuming now that one of the blades 2 breaks in operation, a contact is made at the contact assembly 4 completing the transformer secondary circuit, this circuit including the transformer secondary 23, the leads 9, 10, and the coil of the relay 24. Energization of the relay and consequent actuation of its armature complete a circuit in parallel with the transformer primary circuit through leads 27 and contacts 25, 26 whereby the original input voltage is furnished to the coil of the solenoid 28, thereby actuating pin 33 to expel the switch knock-out pin 35, with the result that spring 37 rotates the bell crank lever 36 to break the circuit through electromagnet 151 of the magnetic switch at the mercury switch 39. Cessation of flow in the electromagnet 151 results in breaking the circuit through the contacts 152, 153, 164, 165 which, of course, de-energizes the motor and the magnetic brake 12. The braking elements (not shown) of the latter are instantaneously applied and quickly terminate the operation of the machine.

From the foregoing, it will be apparent that the mere tipping of the mercury switch or other limit switch 38 is sufficient to produce the energization of the motor and brake. I am well aware that this function of actuating the limit switch could be accomplished by more simplified mechanism than the pivoted and spring urged bell crank lever 36 which I have shown and described; however, I prefer to utilize such means since I find that the bell crank lever is well adapted to serve the further function of stopping the inflow of bread on the feeding belt of the machine when the operation of the knives has been terminated. This is accomplished in an actual embodiment of this machine by engagement of the bell crank lever 36 in its swinging movement with associated levers and a ratchet mechanism (not shown) to terminate the operation of a bread feeding belt. Were this feeding means not brought to a halt, the bread would be thrust against the stationary knives. The aforesaid belt stopping means does not constitute a part of the present invention and I refer to the same merely to emphasize the adaptability to a further function of the particular switch actuating construction which I have shown and described.

As a modification of my invention, it will occur to those skilled in the art that instead of connecting both leads 9, 10 to the secondary 23 of the transformer, one of the leads might be connected to all four contact bars and the other thereof grounded on the machine frame, in which case the saw elements themselves would act as one side of the line. In such case contact of the saw with only one of the contact bars would suffice to originate a control current for terminating the operation of the machine. I have not illustrated this alternative, since it involves merely a slight change in the wiring. However, I desire that it be considered as falling within the scope of my invention. The number and positioning of the contact bars may be varied if desired. Likewise various substitutes for specific instrumentalities shown and described as constituent parts of my cut-off device will suggest themselves to those skilled in the art. It is evident that if desired the full motor voltage could be applied to the contact bars. Although this is unsatisfactory from the standpoint of safety, it would involve only the elimination of the transformer elements of my invention and clearly falls within the inventive concept of the same.

In the foregoing control system, there are a minimum of moving parts and the same is foolproof and unfailing in operation. The parts on the whole are standardized and may be readily applied in the above described relations to any conventional machine.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention what I claim as new and desire to secure by Letters Patent is:

1. In a control device for a band saw slicing machine having a band saw trained about a pair of pulleys, contact means positioned on the machine adjacent one of said pulleys in close proximity to said saw to be immediately engaged by the saw upon breakage thereof, said assembly comprising a pair of contacts on opposite sides of the saw and closely adjacent the latter, said saw being twisted to crossing relation whereby upon breakage of the saw the latter tends to straighten with the resultant engagement of the saw with at least one of said contacts to complete a circuit through the saw at that point, means for energizing said circuit upon completion thereof, and means controlled by said circuit for terminating the operation of the machine.

2. In a control device for a band saw slicing machine having a band saw trained about a pair of pulleys, contact means positioned on the machine adjacent one of said pulleys in close proximity to said saw to be immediately engaged by the saw upon breakage thereof, said assembly comprising a contact on the side of the saw and closely adjacent the latter, said saw being twisted to crossing relation whereby upon breakage of the saw the latter tends to straighten with the resultant engagement of the saw with said contact to complete a circuit through the saw at that point, means for energizing said circuit upon completion thereof, and means controlled by said circuit for terminating the operation of the machine.

3. In a band saw slicing machine having a plurality of continuous flexible band saws, a motor for actuating the latter and a source of current for said machine actuating means, means for terminating the operation of said motor and for quickly bringing the machine to rest in the event of breakage of one or more of the band saws comprising a pair of contact assemblies each including a pair of contacts disposed on opposite sides of the path of travel of the band saws to be engaged by one thereof in the event of breakage to complete a circuit through the respective contacts of the assembly, means for energizing said circuit comprising a transformer having the secondary thereof in series with said contacts, the primary thereof being adapted to be energized from said source, a relay having its coil in circuit with said secondary and adapted to be energized when a circuit is completed through the contacts, magnetic switch means for controlling the supply of current from said source to said motor and transformer, a limit switch in series circuit with said magnetic switch means, and electrically actuable means for actuating said limit switch to de-energize said magnetic switch and terminate operation of said motor comprising pivoted and spring urged mounting means for the limit switch, a solenoid, means controlled by and actuable in response to energization of the solenoid to cause shifting of said mounting means and switch and break the limit switch circuit, and a further circuit in parallel with the primary of said transformer and controlled by the armature of said relay for energizing said solenoid, said last named circuit being completed upon energization of said secondary circuit and relay.

4. In a band saw machine having a motor for actuating the latter and a source of current for said motor, means for terminating the operation of said motor and for quickly bringing the machine to rest in the event of breakage of the band saw comprising a contact disposed closely adjacent the path of travel of the band saw to be engaged thereby in the event of breakage to complete a circuit through the contact and broken saw, means for energizing said circuit comprising a transformer having the secondary thereof in series with said contacts, the primary thereof being adapted to be energized from said source, a relay having its coil in circuit with said secondary and adapted to be energized when a circuit is completed through the contacts, magnetic switch means for controlling the supply of current from said source to said motor and transformer, a switch in circuit with said magnetic switch means, and electrically actuable means for actuating said last named switch to break said last named circuit to de-energize said magnetic switch and terminate operation of said motor comprising a circuit connected with the primary of said transformer and controlled by the armature of said relay for energizing said electrically actuable means, said last named circuit being completed upon energization of said secondary circuit and relay.

5. A device for stopping the operation of a slicing machine including a band saw, a motor for actuating said saw, a brake for said motor, and a source of power for energizing said brake and motor, said device comprising a contact adjacent the saw of said machine whereby said saw completes a circuit through said contact in the event of breakage thereof, means adapted to be connected to said source for establishing a potential at said contact, an electrically actuated switch governing the flow of current from said source to said motor, brake and last named means, and means for controlling said switch comprising a solenoid, means controlled by current flowing through said contacts to energize said solenoid from said source, a limit switch connected in series with said electrically actuated switch and said source of voltage and operative to open the electrically actuable switch when the circuit through the limit switch is interrupted, and means controlled by said solenoid to shift the position of said limit switch to interrupt the circuit through the latter, said motor and brake being de-energized upon interruption of the circuit through the limit switch and said electrically controlled switch.

6. A device for stopping the operation of a slicing machine including a band saw, a motor for actuating said saw, a brake for said motor, and a source of power for energizing said brake and motor, said device comprising a contact adjacent the saw of said machine whereby said saw completes a circuit through said contact in the event of breakage thereof, means adapted to be connected to said source for establishing a potential at said contact, an electrically actuated switch governing the flow of current from said source to said motor, brake and last named means, and means for controlling said switch comprising an electrically actuated device, means controlled by current flowing through said contacts to energize said device from said source, a movable switch connected in series with said electrically actuated switch and said source of voltage and operative to open the electrically actuable switch when the circuit through the movable switch is interrupted, and means controlled by said device to actuate said movable switch to interrupt the circuit through the latter, said motor and brake being de-energized upon interruption of the circuit through the movable switch and said electrically controlled switch.

7. In a device for stopping the operation of a slicing machine including a band saw, a motor for actuating said saw, and a source of power for energizing said motor, said device comprising a contact adjacent the saw of said machine whereby said saw completes a circuit through said contact in the event of breakage thereof, means adapted to be connected to said source for establishing a potention at said contact, an electrically actuated switch governing the flow of current from said source to said motor and last named means, and means for controlling said switch comprising an electrically actuated device, means controlled by current flowing through said contacts to energize said device from said source, a movable switch coonnected in series with said electrically actuated switch and said source of voltage and operative to open the electrically actuable switch when the circuit through the movable switch is interrupted, and means controlled by said device to actuate said movable switch to interrupt the circuit through the latter, said motor being de-energized upon interruption of the circuit through the movable switch and said electrically controlled switch.

8. A control device for terminating the operation of a sawing machine having a sawing element, means for actuating the same and a source of operating voltage for the actuating means, said device comprising contact means associated but normally out of electrical engagement with the element for completion of a circuit through said contact means by the element in the event of breakage and electrical engagement thereof with the contact means, a brake for the motor connected to said source, electrically actuable control means for controlling the flow of current from said source to said actuating means and brake, and means actuated upon completion of said first named circuit for energizing said control means including a switch in series with said control means, electrically actuable means for controlling the actuation of said last named switch to make or break a circuit therethrough, and means for energizing said last named electrically actuable means in response to energization of said first named circuit.

9. A control device for terminating the operation of a sawing machine having a sawing element, means for actuating the same and a source of operating voltage for the actuating means, said device comprising contact means associated but normally out of electrical engagement with the element for completion of a circuit through said means by the element in the event of breakage and electrical engagement thereof with the contact means, electrically actuable control means for controlling the flow of current from said source to said actuating means, and means actuated upon completion of said first named circuit for energizing said control means, including a switch in series with said control means, electrically actuable means for controlling the actuation of said last named switch to make or break a circuit therethrough, and means for energizing said last named electrically actuable means in response to energization of said first named circuit.

10. A control device for terminating the operation of a sawing machine having a sawing element, means for actuating the same and a source of operating voltage for the actuating means, contact means associated but normally out of electrical engagement with the element for completion of a circuit through said means by the element in the event of breakage and electrical engagement thereof with the contact means, electrically actuable control means for controlling the flow of current from said source to said actuating means, and means actuated upon completion of said first named circuit for energizing said control means.

11. A control device for terminating the operation of a sawing machine having a sawing element, said device comprising contact means associated but normally out of electrical engagement with the element for completion of a circuit through said means by the element in the event of and electrical engagement breakage thereof with the contact means, a brake for the machine connected to said source, electrically actuable control means for controlling the flow of current from said source to said brake, and means actuated upon completion of said first named circuit for energizing said control means, including a switch in series with said control means, electrically actuable means for controlling the actuation of said last named switch to make or break a circuit therethrough, and means for energizing said last named electrically actuable means in response to energization of said first named circuit.

12. A control device for terminating the operation of a sawing machine having a sawing element, said device comprising contact means associated but normally out of electrical engagement with the element for completion of a circuit through said means by the element in the event of breakage and electrical engagement thereof with the contact means, a brake for the machine connected to said source, electrically actuable control means for controlling the flow of current from said source to said brake, and means actuated upon completion of said first named circuit for energizing said control means.

13. In a slicing machine having a plurality of band saws trained around a pair of pulleys, a motor for actuating said pulleys to advance said saws and a source of operating voltage for the motor, means for terminating the operation of the machine in the event of breakage of a saw comprising contact means disposed in operative relation to the saws at opposite diametrical sides of one of said pulleys, comprising a pair of contact bars and means for mounting said contact bars on opposite sides of said saws whereby to complete a circuit through the contact bars in the event of breakage of one or more of the saws, a brake for said motor adapted to be energized from said source, and means electrically connected to said contact means and actuable in response to completion of a circuit through the latter to control the supply of current to said motor and brake whereby in the event of breakage the operation of the motor is terminated and the brake is applied.

14. In a slicing machine having a band saw trained around a pair of pulleys, a motor for actuating said pulleys to advance said saw and a source of operating voltage for the motor, means for terminating the operation of the machine in the event of breakage of a saw comprising contact means disposed in operative relation to the saw comprising a contact bar immediately adjacent but out of electrically conducting engagement with said saw whereby to complete a circuit through the contact bar in the event of breakage of the saw and engagement thereof with the bar, a brake for said motor adapted to be energized from said source, and means electrically connected to said contact means and actuable in response to completion of a circuit through the latter to control the supply of current to said motor and brake whereby in the event of breakage the operation of the motor is terminated and the brake is applied.

15. In a slicing machine having a band saw trained around a pair of pulleys, means for terminating the operation of the machine in the event of breakage of a saw comprising contact means disposed in operative relation to the saw comprising a contact bar and means for mounting said contact bar immediately adjacent but out of electrically conducting engagement with said saw whereby to complete a circuit through the contact bar in the event of breakage of the saw and engagement thereof with the bar, and means electrically connected to said contact means and actuable in response to completion of a circuit through the latter to terminate the operation of the machine.

16. A machine of the class described including spaced pulleys and a plurality of band saws trained thereon in crossed or figure-eight relation, a driving motor, an electric brake for said motor, a spring opened control switch for said motor, and an electric means for releasing said switch to permit the closing thereof by its spring and to actuate said electric brake including a pair of opposed contact members disposed adjacent one of the pulleys and so that reaches of the band saws between the pulleys pass between them, the reaches of the saws between the pulleys being normally supported by the pulleys when the saws are under operating tension in a plane parallel to the contact members whereby on the breaking of a saw the torsional stress thereon resulting from its crossed relation on the pulleys will cause it to engage and establish a circuit between said contacts.

17. A machine of the class described including spaced pulleys and a plurality of band saws trained thereon in crossed or figure eight relation, a driving motor, a spring opened control switch for said motor, and an electric means for releasing said switch to permit the closing thereof by its spring including a pair of opposed contact members disposed adjacent one of the pulleys and so that reaches of the band saws between the pulleys pass between them, the reaches of the saws between the pulleys being normally supported by the pulleys when the saws are under operating tension in a plane parallel to the contact members whereby on the braking of a saw the torsional stress thereon resulting from its crossed relation on the pulleys will cause it to engage and establish a circuit between said contacts.

18. A machine of the class described including spaced pulleys and a plurality of band saws trained thereon in crossed or figure-eight relation, a driving motor, a control means for said motor including a pair of spaced contact members disposed adjacent one of the pulleys and so that reaches of the band saws between the pulleys pass between the pairs of contact members, the reaches of the saws between the pulleys being normally supported by the pulleys when the saws are under operating tension out of contact with the contact members whereby on the braking of a saw the torsional stress thereon resulting from its normal crossed relation on the pulleys will cause it to establish a circuit between said contacts.

19. A machine of the class described including pulleys and a plurality of band saws trained thereon in crossed or figure-eight relation, a driving motor, a control means for said motor, and an electrically actuated control means for said motor control means including a contact member disposed adjacent one of the pulleys and so that reaches of the band saws between the pulleys are adjacent to but normally out of contact therewith, the portions of the saws between the pulleys being normally supported by the pulleys when the saws are under operating tension in a plane parallel to the contact member whereby on the breaking of a saw the torsional stress thereon resulting from its crossed relation on the pulleys will cause it to engage said contact.

20. A machine of the class described including pulleys and a plurality of band saws trained thereon, a driving motor, a control means for said motor, and an electrically actuated control means for said motor control means including a contact member disposed adjacent one of the pulleys and so that reaches of the band saws between the pulleys are adjacent to but normally out of contact therewith, the portions of the saws between the pulleys being normally supported by the pulleys when the saws are under operating tension out of engagement with the contact.

KURT W. KUBAN.